Aug. 20, 1935.
H. J. J. M. DE R. DE BELLESCIZE
FADING REGULATOR
Filed Aug. 23, 1930
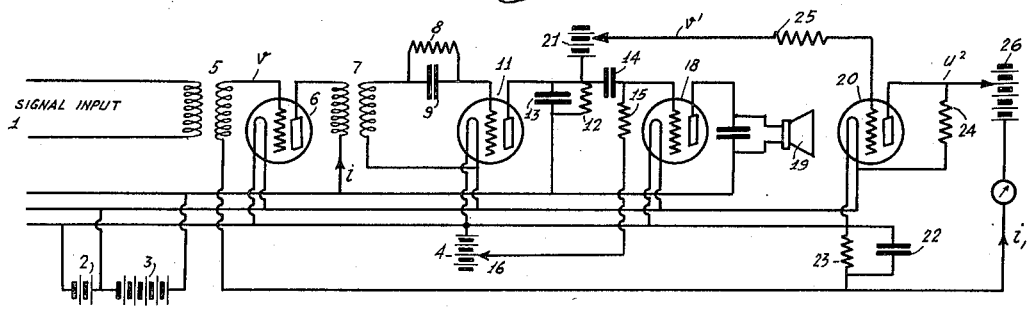
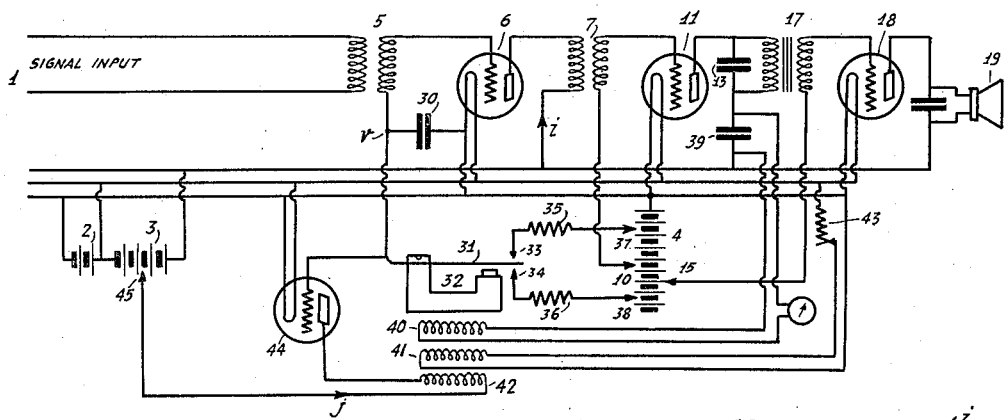
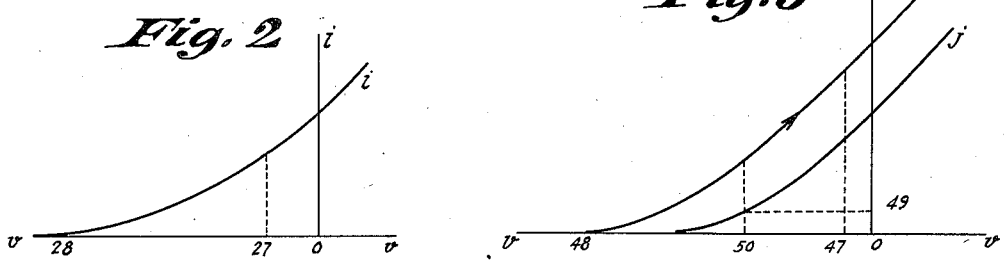
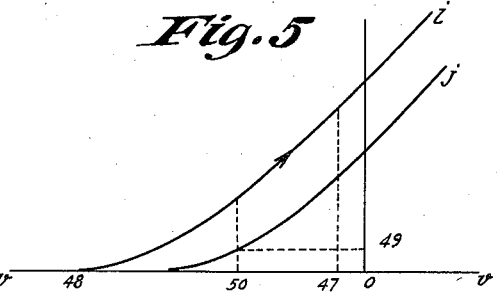
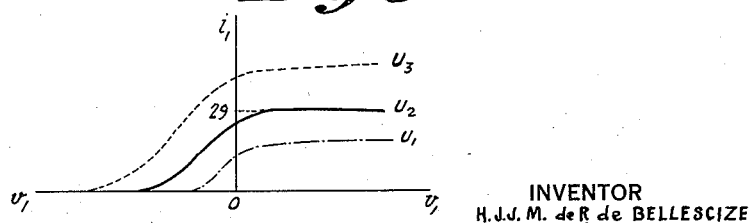
INVENTOR
H.J.J.M. de R de BELLESCIZE
BY
ATTORNEY Patented Aug. 20, 1935

2,011,930

UNITED STATES PATENT OFFICE 2,011,930

FADING REGULATOR

Henri Jean J. M. de Regnauld de Bellescize, Paris, France, assignor to Radio Corporation of America, New York, N. Y., a corporation of Delaware Application August 23, 1930, Serial No. 477,312
In France September 4, 1929

3 Claims. (Cl. 250—20)

The present invention relates to systems for eliminating fading effects and suitable arrangements of circuits for accomplishing the results.

Of the devices conceived for the purpose of reducing the fading almost all have one important fault inherent in the very nature of the problem to be solved. This fault consists, in fact, in correcting the changes in the carrier wave due to fading, at the same time not influencing those which are due to the modulation which constitutes the signal. Hence, the necessity arises to introduce at some point a time constant of fairly high value. In such a case correct results are obtained if the speed of the variations which the fading impresses upon the carrier wave is always smaller in comparison to those which correspond to the various frequencies of the modulation. This is not always the case and the outcome is that the adjusting device acts in retarding manner or even in opposed sense.

In accordance with the present invention, this fault may be corrected by adding to the adjusting device a restricting device, limiting, whatever may happen, the voltage variations, on which the sensitivity of the receiver depends, to the values strictly necessary for producing the desired result.

Two embodiments have been shown by the accompanying drawing: the one, illustrated by Figs. 1-2-3, concerns the anti-fading device in which the detected current influences the sensitivity of the input elements by means of a tube with several electrodes; the other, illustrated by Figs. 4 and 5, concerns an anti-fading device in which the same result is achieved by means of an electro-mechanical relay.

In Fig. 1, the h. f. oscillations constituting the signal arrive at 1, subsequent to their passage through the usual receiving elements such as the antenna, resonators, and the like. This receiver is supplied with energy from the local sources 2—3—4. The incoming signal oscillations influence, for instance by means of transformers such as 5, one or several tubes 6, one of its, or their, electrodes, controlling the sensitivity of the corresponding amplification stage, being impressed with the potential existing at the extremity of a resistance 23, traversed by the detected current. The detection is accomplished by means of one of the methods known in the prior art, for instance by means of the shunted condenser 8—9, connected in series with the grid of tube 11. A connection 12, 13, 14, 15 then transmits the modulation of the carrier wave to tube 18, preferably polarized or biased at 16. The output from tube 18 is then directed to the recording device 19 which may consist of a telegraphic relay or a telephone apparatus.

In parallel with these circuits of low frequency is disposed the device insuring the correction of the fading: the grid of a tube 20 is connected to the top end of a resistance 12 with the insertion of an adjustable source 21 which insures the polarization. The plate circuit of tube 20 comprises the resistance 23 and the condenser 22, the assembly being provided with a suitable time constant. The plate potential is obtained by means of a battery 26 whose voltage would have no effect in an ordinary anti-fading device. This source 26 will be preferably placed between the resistance 23 and the plate in order to eliminate a polarization cell, which would be disposed adjustably in the conductor, connecting the resistance 23 to the grid of tube 6. In this circuit arrangement, representing nothing new up to now, any increase in the intensity of the carrier wave will reveal itself by a voltage increase at the extremity of the resistance 12 and therefore at the grid of 20; only one manipulation will have to be done and that is the adjustment of the tap 21 in the manner that the plate circuit of 20 begins to discharge as soon as the carrier wave reaches the desired limit. This discharge causes a potential drop at 23, hence, a desensibilization of the amplifier stage 6.

The fault, which the invention proposes to rectify, appears when a fading suddenly succeeds an increase and then a reduction in the intensity of the signal. The start of the phenomenon—increase in the intensity of the signal carrier, for tube 20 an elevation in the grid potential and the generation of an intense plate current which can not be reduced at all for the reason that the time constant of the assembly 22—23 prevents the immediate desensibilization of stage 6, results therefore in the storage of a considerable quantity of electricity in the condenser 22. The effect of the subsequent sudden reduction in the intensity of the signal finds the regulator then in a poor operating condition, in fact, in spite of the potential drop at the grid of tube 20, the resistance 23 is still traversed by a current originating from the discharge of the quantity of electricity stored in the capacity 22. Accordingly, the receiver continues to be desensibilized by the anti-fading which acts, not any more retarding, but in opposite sense and a more or less long part of the signal is not recorded at 19.

For the purpose of remedying this situation the usual circuit arrangement is modified in the manner that, whatever the speed with which the intensity of the signal increases in the first place, the tube 20 shall never furnish a plate current greater than the one required absolutely for nullifying the sensitivity of the tube 6. Let Fig. 2 represent the characteristic of the plate current $i$ as function of the grid potential $v$ of this tube; further $Ve = 0-28$, the polarization annulling the sensitivity, and $R_0$ the value of the resistance 23. The maximum current to discharge in the resistance 23 has the value:

$$I_0 = \frac{V_0}{R_0}$$

Consequently the tube 20 acts as restricting tube in the manner that its characteristic reaches the top at the amplitude $0-29 = I_0$ (Fig. 3). All that is necessary to accomplish this is to dispose a high resistance 25 in series with its grid (which produces the effect, as is known, to establish a bend in the characteristic), and to adjust carefully its plate potential $u$ with the aid of the tap 26; a too strong a potential $u_3$ (Fig. 3) would leave a part of the fault still remaining, whose nature has just been explained; a too feeble a potential $u_1$ would not allow a sufficient desensibilization of the tube 6.

A resistance 24 of relatively large size compared to 23 completes the device; it has the function of permanently shunting the source 26, even if tube 20 is polarized greatly in the negative sense. This has the effect of producing in resistor 23 and, consequently, at the grid of tube 6, an initial potential drop such as $0-27$ (Fig. 2) corresponding to a point of the characteristic of this tube reaching practically its maximum inclination. Thus, any sudden increase in the intensity of the signal, which might cause the tube 20 to discharge, is revealed by an immediate effective increase of the polarization of tube 6. In this manner the retarding effects of the anti-fading regulator are reduced.

The example according to Figs. 4 and 5 concerns devices with electromechanical relay. The sensitivity of the amplification stage 6 depends in this case on the potential $v$ at the terminals of a condenser 30, the latter being charged in turn by the action of a relay 32 connecting the same, across the resistances 35—36; with the one or the other of the taps 37—38; one corresponds (Fig. 5) to the potential $0-47$ for which the characteristic of tube 6 has practically reached its maximum inclination; the other, at the potential $0-48$, nullifies the sensibility. The relay itself is energized by a coil 40, traversed by the detected current of the carrier wave. An adjustment, for instance, the one of the auxiliary coil 41 and of rheostat 43, is the means for adjusting the relay in the manner that its armature is in a state of equilibrium between the contacts 33—34 when the carrier wave has the exact desired amplitude.

A very apparent fault is observed in telephony; a sudden increase in the intensity of the signal, subsequent to a strong fading, produces a report in the telephone receivers. This phenomenon may be explained as follows: during a fading, making use of the entire sensitivity of the receiver, the detected current decreases and the armature 31 will bear against contact 33, releasing, with the aid of tap 37, a potential such as $0-47$ (Fig. 5); the condenser 30 tends to acquire this potential and the sensitivity of the tube 6 increases; this increase, at first rapid, becomes slower and slower for the reason that, on the one hand, while it moves on the characteristic in the sense indicated by the arrow, the curvature varies less and less quickly; on the other hand, the potential $v$ at the terminals of condenser 30, being produced according to an exponential law, varies slower and slower in proportion as it approaches the asymptotic limit $0-47$. Hence, it is necessary to dispose this limit to the extreme right (Fig. 5) of the potential $0-50$ for which the inclination of the characteristic comes within the vicinity of its maximum. But assuming now a sudden increase in the intensity succeeding the fading and producing the release of the armature of the relay with the result that the source 30 of the potential $0-48$ enters into action; during the time which the charge $v$ of condenser 30 requires for traversing the interval 47—50, the sensitivity is subject to only a slight decrease; hence the report heard at the receiver.

For the prevention of this phenomenon there may be employed, according to the invention, an auxiliary tube 44 whose grid is impressed with the potential $v$ of condenser 30, and the plate with a potential 45 so that the lower start of the characteristic $j = f(v)$ takes place (Fig. 5) for a grid potential which is very close to the value $0-50$. This plate current $j$ will be sent into an auxiliary coil 42 of the relay for the purpose of dropping the armature towards the desensibilization contact 34. In this manner the potential of condenser 30 is, whatever may happen, automatically limited to the higher value $0-50$. Under the effect of a strong fading followed by a sudden increase in the intensity of the signal, the adjustment is now accomplished as follows: During the fading, the armature first establishes the contact 33 and puts into action the potential source $0-47$; this potential may have a high value and may even be positive since the potential $v$ of the condenser will not reach it; hence, the increase of $v$ is very rapid and the fading corrected with optimum results. When $v$ reaches the value $0-50$, it does not have to exceed it, since it corresponds to the limit of sensitivity of the amplifier stage. Then the current $j$ of the auxiliary valve 44 enters into action, the armature leaves the contact 33 and, as long as it is not influenced by a change, remains in the state of equilibrium. Afterwards, the sudden increase in the intensity subsequent to the fading, attracts the former towards contact 34, releasing for action the potential source $0-48$; the charge $v$ decreases and this decrease, starting from the value $0-50$, at once produces the one of the sensitivity; hence, the correction of the regulator again is in the right direction, the report in the receiver disappears.

While the invention has been described in connection with two of its preferred embodiments, it will be understood, of course, that other modifications and changes may be made to the system herein disclosed by those skilled in the art to which the invention relates, and I, therefore, believe myself to be entitled to make and use all such modifications as fall fairly within the spirit and scope of the hereinafter appended claims.

Having now described my invention, what I claim and desire to secure by Letters Patent is the following:

1. In an anti-fading receiver for electromagnetic waves, means for radio frequency amplification, means for detection including an input and output circuit, means for controlling the radio frequency gain by a potential which varies depending upon the value of the detected current, said last means comprising an electron discharge device having a control electrode adapted to receive the detected currents and an anode circuit, and a connection connecting said control electrode only with the output circuit of said detection means, a resistance and a condenser connected in parallel to said resistance and associated with the anode circuit of said electron discharge device, said anode circuit being connected with said radio frequency amplification means and adapted to supply said potential for controlling the radio frequency gain, said resistance and condenser being responsive to a maximum value of current flowing in said anode circuit to control said value of potential to reduce the amount of radio frequency amplification to zero, and separate means for establishing the minimum and maximum current supplied by the said discharge device at such values that the control potential does not exceed limits corresponding, on the one hand, to the value at which the slope of the characteristic of the tube of the high frequency amplification becomes zero, and on the other hand, corresponding to the value at which this slope ceases to increase.

2. In an anti-fading receiver for electromagnetic waves, means to amplify the radio frequency currents, means to detect radio frequency currents, said last means having an input circuit and an output circuit, an electron discharge device connected to the output circuit of said detection means and adapted to be controlled by the detected currents and having an anode, a cathode and a control electrode, a high time-constant circuit constituting a resistance and a capacity in shunt of said resistance associated with said anode and with said radio frequency amplification means for controlling the amplification thereof, a resistance connected to the control electrode of said electron discharge device and having such value as to limit the maximum current in the input circuit of said device such that the current flowing through the resistance of the high time-constant circuit sets up a potential strictly necessary to reduce the radio frequency amplification to zero, and another resistance directly connecting said cathode and said anode and having a value such that when the detected currents are of maximum value a potential is set up corresponding to the beginning of the maximum slope of the characteristic of the radio frequency amplification means.

3. In an anti-fading receiver for electromagnetic waves, a radio frequency amplifier, a detector, an electron tube responsive to the action of said detector, said electron tube having a non-linear input voltage-output current characteristic, means for separately adjusting two ends of this characteristic to limit in the two directions variations of the said output current, said means comprising a circuit arrangement whereby one end of the said non-linear characteristic is adjusted to reduce to zero the minimum radio frequency gain, and the other end of the said non-linear characteristic is adjusted to raise the maximum radio frequency gain to a predetermined value, and a high time-constant circuit associated with the output of the said electron tube and connected with the input of the said amplifier for controlling the radio frequency gain according to the variations of the said limited output current.

HENRI JEAN J. M. DE
REGNAULD DE BELLESCIZE.